(12) United States Patent
Schramm et al.

(10) Patent No.: US 11,647,146 B2
(45) Date of Patent: *May 9, 2023

(54) COLOR RESOURCES

(71) Applicant: HEWLETT-PACKARD DEVELOPMENT COMPANY, L.P., Spring, TX (US)

(72) Inventors: Morgan T. Schramm, Vancouver, WA (US); Ranjit Bhaskar, Vancouver, WA (US); Jesse Otto Sutherland, Vancouver, WA (US); Wesley R. Schalk, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,913

(22) Filed: Nov. 5, 2021

(65) Prior Publication Data

US 2022/0060603 A1 Feb. 24, 2022

Related U.S. Application Data

(63) Continuation of application No. 16/609,462, filed as application No. PCT/US2018/029844 on Apr. 27, 2018, now Pat. No. 11,258,926.

(51) Int. Cl.
*H04N 1/60* (2006.01)
*G06F 3/12* (2006.01)

(52) U.S. Cl.
CPC ......... *H04N 1/603* (2013.01); *G06F 3/1208* (2013.01); *H04N 1/6008* (2013.01); *H04N 1/6066* (2013.01)

(58) Field of Classification Search
CPC .... H04N 1/603; H04N 1/6008; H04N 1/6066; G06F 3/1208
See application file for complete search history.

(56) References Cited

U.S. PATENT DOCUMENTS

| 4,590,515 | A | * | 5/1986 | Wellendorf | .......... | H04N 1/6027 358/518 |
| 4,908,712 | A | * | 3/1990 | Uchiyama | ............ | H04N 1/6022 358/529 |

(Continued)

FOREIGN PATENT DOCUMENTS

| JP | 5335403 B2 | * | 11/2013 | ........... H04N 1/6022 |
| JP | 5335403 B2 | | 11/2013 | |

(Continued)

*Primary Examiner* — Ted W Barnes
(74) *Attorney, Agent, or Firm* — Brooks, Cameron & Huebsch, PLLC

(57) ABSTRACT

Example color resources are generated. A first luminosity amount of a greyscale color in a greyscale color space is determined. The greyscale color corresponds with a transformation of a source color in a first color space converted to the greyscale color. The source color corresponding with a depletion color in a second color space, and the depletion color has a second luminosity amount. A target color in a color resource is generated via adjusting a black channel amount in the depletion color to match the second luminosity amount with the first luminosity amount. The target color to correspond with the source color in the color resource.

20 Claims, 2 Drawing Sheets

(56) References Cited

U.S. PATENT DOCUMENTS

| | | | | |
|---|---|---|---|---|
| 5,297,058 | A * | 3/1994 | Samworth | H04N 1/465 |
| | | | | 382/167 |
| 5,331,438 | A * | 7/1994 | Harrington | H04N 1/6022 |
| | | | | 358/529 |
| 6,061,501 | A * | 5/2000 | Decker | G06K 15/02 |
| | | | | 358/529 |
| 6,343,851 | B2 * | 2/2002 | Moskalev | H04N 1/6022 |
| | | | | 347/19 |
| 8,542,405 | B2 * | 9/2013 | Fischer | H04N 1/6061 |
| | | | | 358/1.9 |
| 2002/0089565 | A1 * | 7/2002 | Lopez | H04N 1/52 |
| | | | | 358/1.9 |
| 2003/0007164 | A1 * | 1/2003 | Lee | H04N 1/54 |
| | | | | 358/1.9 |
| 2005/0083371 | A1 * | 4/2005 | DeBaer | H04N 1/6097 |
| | | | | 347/15 |
| 2006/0158673 | A1 * | 7/2006 | Gondek | G06K 15/102 |
| | | | | 358/1.13 |
| 2009/0185230 | A1 * | 7/2009 | Mestha | G06K 15/1822 |
| | | | | 358/3.23 |
| 2010/0303346 | A1 * | 12/2010 | Suito | H04N 1/407 |
| | | | | 382/163 |
| 2018/0082115 | A1 * | 3/2018 | Itan | G06F 18/2155 |

FOREIGN PATENT DOCUMENTS

| | | | | |
|---|---|---|---|---|
| WO | 2017/012642 | A1 | 1/2017 | |
| WO | 2017/151781 | A1 | 9/2017 | |
| WO | WO-2017151781 | A1 * | 9/2017 | B41J 29/38 |
| WO | 2019/221709 | A1 | 11/2019 | |
| WO | WO-2019221709 | A1 * | 11/2019 | G06F 3/04817 |

* cited by examiner

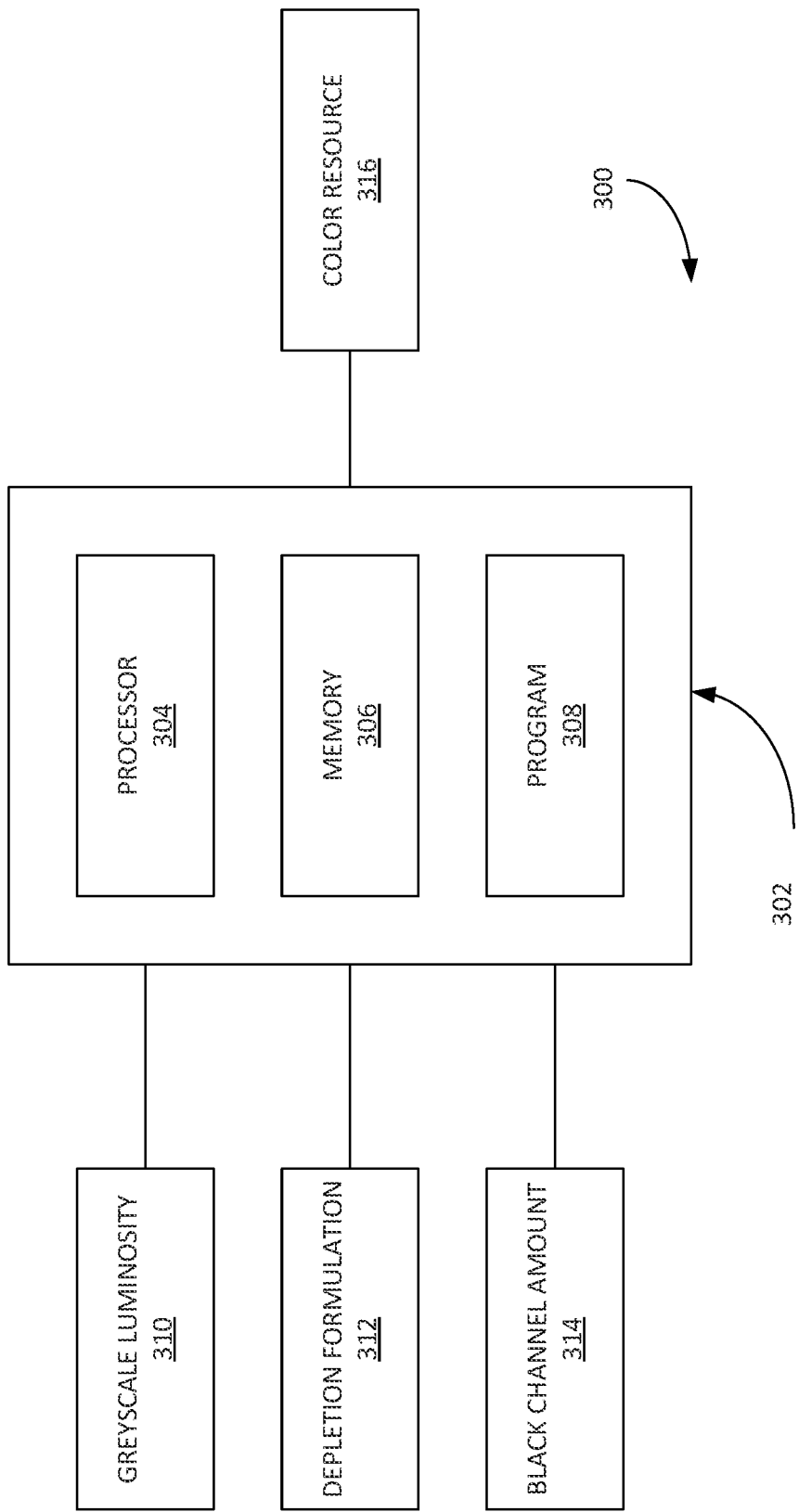

COLOR RESOURCES

CROSS-REFERENCE TO RELATED APPLICATIONS

This application is a continuation of U.S. application Ser. No. 16/609,462, filed on Oct. 30, 2019, and titled COLOR RESOURCES, which is a U.S. National Stage Application of International Application No. PCT/US2018/029844, filed Apr. 27, 2018, both of which are incorporated herein by reference.

BACKGROUND

Color management systems deliver a controlled conversion between color representations of various devices, such as image scanners, digital cameras, computer monitors, printers, and corresponding media. Device profiles provide color management systems with information to convert color data between color spaces such as between native device color spaces and device-independent color spaces, between device-independent color spaces and native device color spaces, and between source device color spaces and directly to target device color spaces.

BRIEF DESCRIPTION OF THE DRAWINGS

FIG. 3 is a block diagram illustrating an example system to implement the example methods of FIGS. 1 and 2 and produce an example color resource.

DETAILED DESCRIPTION

Figure 1:
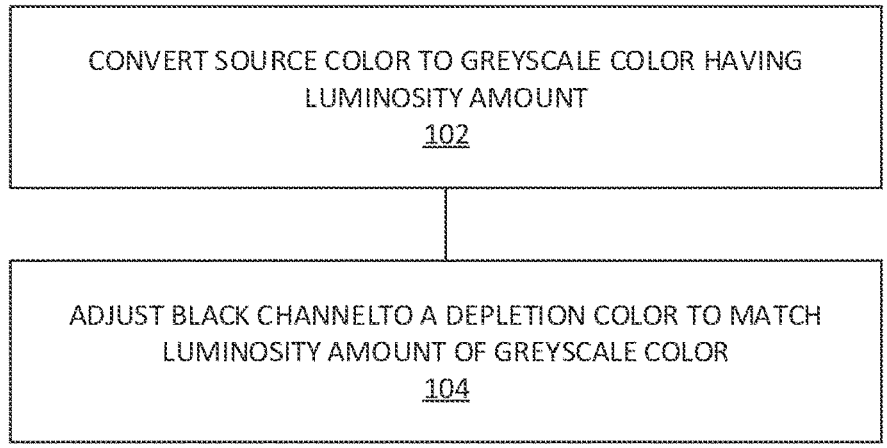
FIG. 1 is a block diagram illustrating an example method.

A color space is a system having axes and that describes color numerically. Some output devices, such as printing devices, may employ a type of subtractive color space, which can include a type of cyan-magenta-yellow-key (black) (CMYK) color space, while some software applications and display devices may employ a type of additive color space, which can include a type of red-green-blue (RGB) color space. For example, a color represented in an RGB color space has a red value, a green value, and a blue value, and a color represented in a CMYK color space has a cyan value, a magenta value, a yellow value, and a key value, that combined numerically represent the color. A color gamut for a device is a property of the device that includes the range of color (and density/tonal values) that the device can produce as represented by a color space. A color in the additive color space can be represented via a red component, a green component, and a blue component, and a color in the subtractive color space can be represented via a cyan component, magenta component, a yellow component, and a black component. As used in this disclosure, a process color component includes the cyan, magenta, and yellow components in the subtractive color space and does not include the black component in the subtractive color space.

A color resource, or color management resource, is a set of data based on the color gamut characterization in a color space. A color profile is an example of color management resource. A color profile is a formal set of data that characterizes the color gamut in a color space. In one example, a color profile can describe the color attributes of a particular device or viewing specifications with a mapping between the device-dependent color space, such as a source or target color space, and a device-independent color space, such as profile connection space (PCS), and vice versa. The mappings may be specified using tables such as look up tables, to which interpolation is applied, or through a series of parameters for transformations. Devices and software programs—including printing devices, monitors, televisions, and operating systems—that capture or display color can include color profiles that comprise various combinations of hardware and programming. An ICC profile is an example color profile that is a set of data that characterizes a color space according to standards promulgated by the International Color Consortium (ICC). Examples of this disclosure using particular profiles, such as ICC profiles, however, are for illustration only, and the description is applicable to other types of color profiles, color management resources, or color spaces.

The ICC profile framework has been used as a standard to communicate and interchange between various color spaces. An ICC output profile includes color table pairs, so-called A2B and B2A color look up tables, where A and B denote the device-dependent and the device-independent color spaces, respectively. For different devices, there are different look up table rendering intent pairs. For example, an ICC profile allows for three color table pairs, enumerated from 0 to 2, enabling the user to choose from one of the three possible rendering intents: perceptual, colorimetric, or saturation. ICC profiles are often embedded in color documents as various combinations of hardware and programming to achieve color fidelity between different devices. The size of color tables will increase with finer sampling of the spaces and larger bit depths.

Color tables that provide transformations between various color spaces are extensively used in color management, common examples being the transformations from device independent color spaces (such as CIELAB, i.e., L*a*b*) to device dependent color spaces (such as RGB or CMYK) and vice versa. The mappings may be specified using tables such as single dimensional or multidimensional look-up tables, to which interpolation can be applied, or through a series of parameters for transformations. A color table can include an array or other data structure stored on a memory device that replaces runtime computations with a simpler array indexing operation as a color look-up table. For the purposes of this disclosure, color tables can also include monochromatic and greyscale color tables. In a greyscale table, for example, the value corresponding to a source color space such as RGB is of luminous intensity.

Printing devices—including printers, copiers, fax machines, multifunction devices including additional scanning, copying, and finishing functions, all-in-one devices, pad printers to print images on three dimensional objects, and three-dimensional printers (additive manufacturing devices)—employ color management systems including color management resources to deliver a controlled conversion between color representations of various devices, such as image scanners, digital cameras, computer monitors, printers, and software applications including browsers and photo and design programs. In general, printing devices apply a print substance, which can include printing agents or colorants, to a substrate. A substrate is a superset of print media, such as plain paper, and can include any suitable object or materials to which a print substance from a printing device are applied including materials, such as powdered build materials, for forming three-dimensional articles. Print substances, including printing agents and colorants, are a superset of inks and can include toner, liquid inks, or other suitable marking material that may or may not be mixed with fusing agents, detailing agents, or other materials and can be applied to the substrate.

Printing devices often employ color tables to provide transformations between input color spaces and subtractive color spaces to determine corresponding formulations of print substance amounts, such as print substance volumes, to render the intended colors. In one example, printing devices often employ color tables including multidimensional color look-up tables to provide transformations between different color spaces such as from input device-independent colors to CMYK print substance amounts in the case of two-dimensional printing devices for printing on media or, in the case of three-dimensional printing devices, printing agent amounts for printing on a powder or other material. Many colors in the gamut of a CMYK color space for printing devices can be rendered from just the set of process colors of cyan, magenta, and yellow and, in some color resource models, do not include a black channel. In many printing devices and printing modes, however, an achromatic black channel can be added to some of colors in in the CMYK color space order to reduce process color print substance consumption for some darker colors, stabilize neutral color such as in the grey tones, and to improve printability of blacks.

For devices such as color printers or other printing devices, color resources including the color tables can be embedded in memory devices storing the printer firmware or other hardware. In some examples, the particular color transform of the color resource may be colorant-dependent, such as dependent on the particular formulation of each of the print substance included in a supply component such as a cartridge, and information regarding the color gamut characterization in the color resource can be stored on a memory device located on the cartridge for use with the printing device such as its firmware or other hardware.

In one example, a color table environment such as a printing device may include a plurality of multidimensional color tables that can correspond to substrates, rendering intents, and colorant axes of a color gamut, among other things, included in a color profile. In general, a profile can include N color tables to be processed, such as $CLUT_1$, $CLUT_2$, . . . , $CLUT_N$, and the input color space includes $J_{in}$ channels. In one example, multiple color tables representing different rendering intents can be included with one ICC profile. Additionally, the output color space includes $J_{out}$ channels, and in many examples of an ICC profile $J_{in}$ and $J_{out}$ can be 3 or 4 channels. For each output channel, the corresponding lookup table contains $M^{J_{in}}$ nodes. For example, each color table can include $M^4$ nodes for each of the cyan, magenta, yellow, and black four colorants corresponding with each printing fluid color such as ink color used in the printing device or $M^3$ nodes for each of the red, green, and blue three primaries corresponding with each primary color used in the display device. Additionally, each type of substrate used in the printing device can include a set of color tables.

Typically, cyan, magenta, and yellow printing agents or colorants are significantly more expensive than similar amounts of black printing agents or colorants; and depending on the application or the industry, the disparity can lead to a substantially greater expense for color printing in color versus black and white printing. Some users may attempt to address this additional expense by generally printing documents in greyscale, or black and white mode, while selectively printing documents in full color mode or by printing all documents in black and white mode. Often, black and white mode versions of color documents lack significant information or distinctions that users may find valuable. Other users may attempt to address the additional expense by printing color documents in a depleted color mode with depleted colors that compromises print quality. In a typical example of a depleted color mode, the amount of the color printing agent or colorant is uniformly scaled back from an amount used in full color mode to produce a washed out depiction of the source document. As many colors do not include a black component in the CMYK color space, such as pastels, such colors become depleted to almost white. While uniform color depletion outputs may convey more information than black and white mode and save on expense over a full color mode, such color depletion outputs typically include poor image quality that many users find unappealing at meaningful reductions in printing agent expense.

In response to the added expense of printing in a full color mode and the poor image quality of printing in black and white mode or depleted color mode, the printing industry has developed component replacement technologies to improve image quality while reducing the amounts of color printing agents or colorants. One such technology includes grey component replacement, or GCR, which replaces a selected amount of CMY printing agents or colorants with black printing agents or colorants for many colors. GCR renders many colors with a combination of black and just two colors of three CMY printing agents or colorants instead of three colors of CMY printing agents or colorants. GCR can provide significantly better image quality than uniform color depletion and black and white outputs, and GCR typically saves approximately 20% in costs over full color printing.

The disclosure describes a color resource to transform source colors to target colors that can provide substantial reductions in expense of process color printing agents or colorants while maintaining high dynamic range and visually appealing color in the printed document. Target colors are printed with a combination of a black print substance and a formulation of print substance including a process color (cyan, magenta, and yellow in the subtractive color space). The printed target colors included a luminous intensity of a greyscale version of the source color. Unlike traditional methods or mechanisms of moderating use of printing agents or colorants, the color resource can address luminous intensity across color ramps. This can provide for darker midtone colors even at low levels of printing agents and can preserve hues of the source colors while avoiding a washed out or watercolor appearance of the target color.

FIG. 1 illustrates an example method 100 for creating a color resource, such as color profile or other set of color management data. In the example, the color resource can be used to map a source color from a first color space to a target color in a second color space and stored on a memory device for use with a printing device. The first color space may be different than the second color space, and, in one example, the second color space may be a device dependent color space and can include a subtractive color space of a printing device. For instance, the printing device may employ a CMYK color space corresponding with process colors of cyan, magenta, and yellow printing agents or colorants and a black printing agent or colorant. In the example method 100, a source color is converted from the first color space to a corresponding greyscale color in a greyscale color space at 102. The greyscale color includes a luminosity amount corresponding with a luminous intensity of the greyscale color, or first luminosity amount, which is determined or measured. In one example of converting the source color to a corresponding greyscale color at 102, the source color is converted to a corresponding greyscale color, which is printed on a substrate and measured to obtain the first luminosity amount. For some examples of a first color space, such as the additive color space sRGB (which was standardized by the International Electrotechnical Commission as IEC 61966-2-1:1999), the first luminosity amount can be determined directly from the source color via a mathematical translation of the source color to greyscale. Luminosity amount is related to the luminous intensity of the greyscale color and not to a particular formulation or technique to determine luminous intensity.

The target color in the second color space is generated from a depletion color. The target color in the second color space represents the source color in the first color space in the color resource. The depletion color in the second color space corresponds with a transformation of the source color in the first color space. In one example, the depletion color can correspond with an intermediate transformation of the source color. For instance, the depletion color includes a selected process-color formulation of the source color. In the example of the second color space as a subtractive or CMYK color space, the depletion color is formulated from one, two, or three colors selected from the process colors of cyan, magenta, and yellow, and includes amounts in a cyan channel, magenta channel, and yellow channel. As used in this disclosure, a process color component is of the set of cyan, magenta, and yellow, and can include a zero amount of cyan, magenta, or yellow, but does not include the black component. In one illustration, the depletion color includes a black channel amount of zero. The depletion color, in one example range, can include ten percent to thirty percent of process color amounts, i.e., an amount of print substance for the process colors (cyan, magenta, and yellow), used to produce a full color version of the source color in the second color space. In one example, amounts are determined by volume of print substance. In another example range, the depletion color can include ten percent to twenty percent of an amount of print substance for the process colors (cyan, magenta, and yellow) used to produce a full color version of the source color in the second color space. Accordingly, a depletion color from the process colors may include a luminosity amount that is less than the first luminosity amount of the greyscale color at 102.

An amount in the black channel, for the second color space, is provided to the depletion color and adjusted to generate the target color such that the luminosity amount of the target color, or second luminosity amount, matches the first luminosity amount of the greyscale color at 104. One example of matching the first luminosity amount to the second luminosity amount includes providing a second luminosity amount that is identical to the first luminosity amount. Another example of matching the first luminosity amount to the second luminosity amount includes providing a second luminosity amount that is generally the same to the first luminosity amount such as a second luminosity amount that is within a few percent of the first luminosity amount. In this example of matching the first luminosity amount to the second luminosity amount includes providing a second luminosity amount visually generally imperceptible to the naked eye of first luminosity amount.

Figure 2:
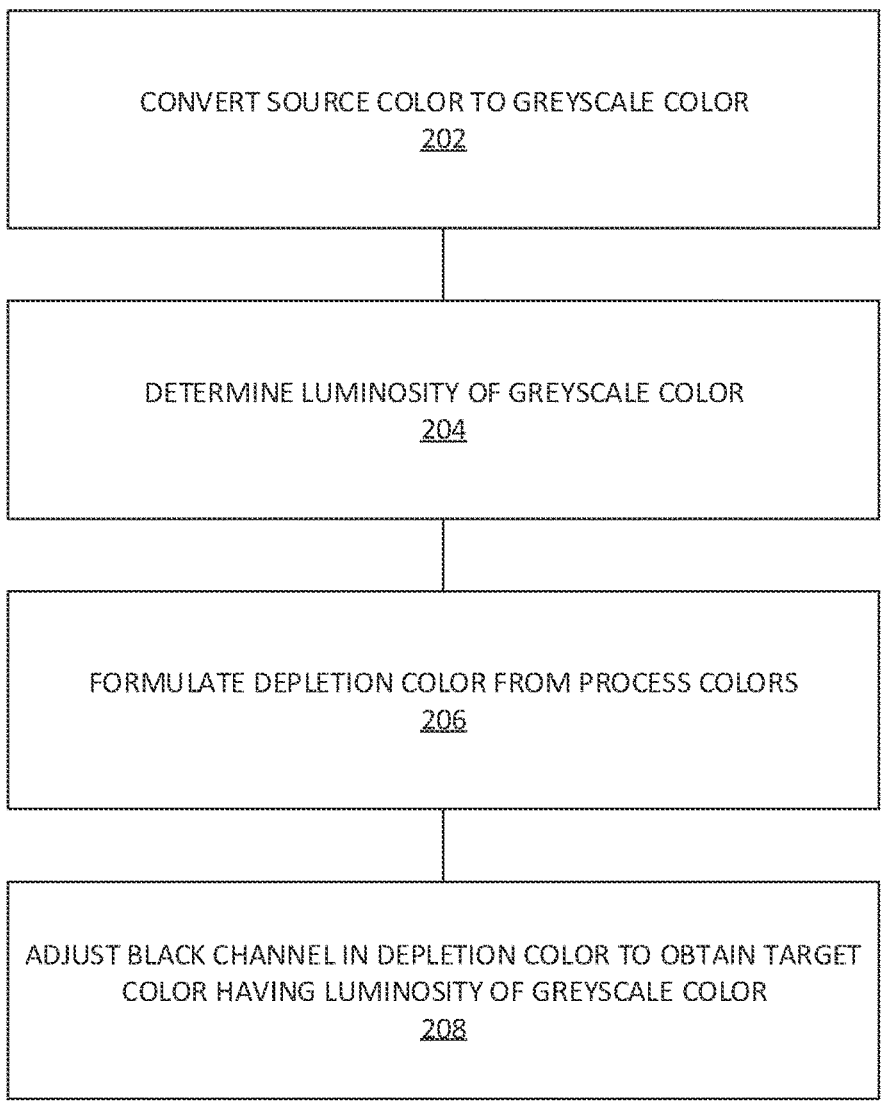
FIG. 2 is a block diagram illustrating an example method to build a color resource according to the method of FIG. 1.

FIG. 2 illustrates an example method 200 to implement method 100 and create the color resource to map a source color from a first color space to a target color in a second color space. For illustration, the source color is selected from a color gamut in an additive color space and the target color is provided to a color gamut in a subtractive color space, such as a CMYK color space for a printing device. The target color is formulated from process colors of cyan, magenta, and yellow printing agents or colorants as well as a black printing agent or colorant. The source color is converted to a corresponding greyscale color in a greyscale color space at 202. The luminous intensity of the greyscale color is determined as a first luminosity amount at 204. A depletion color is formulated in the second color space from process color components of the second color space at 206. An amount of a black component is provided to the depletion color to obtain a second luminous amount of luminous intensity that matches the first luminous amount to obtain the target color at 208.

In one example of creating the color resource via method 200, a plurality of source colors from the color gamut of the first color space are selected for transformation to corresponding target colors in the second color space. In one example, a relatively small subset of source colors are transformed via method 200. The remaining colors of the colors of the color gamut can be determined via interpolation and additional adjustments to color components of the second color space.

A number of mechanisms can be employed to convert the source color to a corresponding greyscale color at 202. In one example, a process to convert the source color in an RGB color space can involve a transformation of the color space components to black component. For instance, one process involves an application of a formula to the amounts of a red component R, green component G, and blue component B to determine an amount of a black component K in the greyscale color space. A process termed Luma often used for video processing can yield an acceptable result and includes K=(0.3*R)+(0.59*G)+(0.11*B). A similar process termed Luminosity can be used in which K=(0.21*R)+(0.72*G)+(0.07*B). Such processes can provide a relatively higher contrast in the conversion of source colors to greyscale colors than other processes, such as simple averaging in which K=(R+G+3. In other examples, the process to convert the source color to a greyscale color can be performed via an established look-up table.

In the example method, the first luminosity amount corresponding with the source color at 204 is determined from the luminous intensity of the greyscale color developed in the conversion at 202. In one example, the first luminosity amount is the L* value of L*a*b* coordinates in CIELAB data for the greyscale color. In one example, the first luminosity amount corresponding with the source color, such as for source colors in the sRBG color space, can be determined via mathematical formula. In other examples, the first luminosity amount is determined from printing the greyscale color on a substrate with the printing device and measuring the output with a spectrophotometer or other device to obtain measurement values as data. The first luminosity amounts can be provided with each color in the color gamut of the first color space such as in a data structure including a matrix or look-up table.

The depletion color is formulated in the second color space from process color components of the second color space at 206. The formulation for the depletion color can be made with reference to the source color and a corresponding full color version of the source color in the second color space. For example, the formulation of the depletion color can be made with reference to the hue of the source color and the amounts of print substances in the components of the full color version. The depletion color can be formulated from the process colors to maintain a similar hue as the source color. Additionally, the formulation of the depletion color can include a significantly less amount of printing agents or colorants for the process colors than the print substances of the full color version. For example, a depletion color in the CMYK color space corresponding with a given source color will include less total amount of cyan, magenta, and yellow printing agents or colorants than the amount of cyan, magenta, and yellow printing agents or colorants used to produce an associated full color version of the source color.

The depletion color can appear as a washed out version of the source color. In particular, the luminous intensity of the depletion color may be significantly less than the luminous intensity of the source color. Depletion colors having formulations containing ten percent to thirty percent of an amount of process-color printing agents or colorants of corresponding full color versions of the source colors have been demonstrated to not provide enough satisfactory visual appeal and dynamic range so as to be substituted for full color versions of the source colors. A selected amount of black component is added to the depletion color to obtain a target color having a luminous intensity that matches the luminous intensity of the greyscale color corresponding with the source color at 208. A second luminosity value that matches the first luminosity amount can include a range of values that include a value that is identical to the first luminosity amount as well as similar, but non-identical amounts that may account for such factors as visual perception of differences between the first and second luminosity amounts, tolerances in printing, tolerances in measurement techniques, deviations of substrates used to produce the target color, as well as other variations.

In one example, a selected amount of black printing agent or colorant is provided to the depletion color formulation to obtain a luminosity amount of the target color that matches the first luminosity amount of the greyscale color determined at 204. For instance, an amount of the black channel component can be adjusted until the target color output for the printing device includes a luminous intensity that matches the first luminosity amount. The second luminosity amount can be determined from printing the target color on a selected substrate and measuring the luminous intensity via a spectrophotometer or other measurement device. Depletion colors having formulations containing ten percent to thirty percent of an amount of process-color printing agents or colorants of corresponding full color versions of the source colors provided with the selected amount of black printing agent or colorant to match the first luminosity amount have been demonstrated to provide a satisfactory visual appeal and dynamic range so as to be substituted for full color versions of the source colors. Further, depletion colors having formulations containing ten percent to twenty percent of an amount of process-color printing agents or colorants of the corresponding full color versions of the source colors provided with the selected amount of black printing agent or colorant to match the first luminosity amount have also been demonstrated to provide a satisfactory visual appeal and dynamic range so as to be substituted for full color versions of the source colors.

The resulting process color values to obtain the process color formulation and the black channel value to obtain the second luminosity amount of the target color are provided to the color resource as part of the mapping from source color to target color. In one example, the color resource maps the source color to four CMYK components of the target color in which the values in the four CMYK components may correspond with amounts or volumes of printing agents or colorants for use with a printing device.

In one example, a subset of the color gamut including six source colors are transformed via method 200. These six source colors can include versions of red, green, blue, cyan, magenta, and yellow. Luminosity amounts corresponding with these six colors along with corresponding depletion color formulations and black channel values in the corresponding target colors can be interpolated to obtain the remaining colors of the color gamut. Generating a full color profile via interpolation in printing agent or colorant volume can result in non-linear transitions of luminosity amounts. Corrections to the values of the CMYK components can be achieved using linearization tables to the individual components. Manual correction of the components is relatively straightforward.

The example methods 100, 200 can be implemented to include hardware devices, programs, or hardware device and programs for controlling a system, such as a computing device having a processor and memory, to perform methods 100, 200 to generate a color resource. For example, methods 100, 200 can be implemented as a set of executable instructions stored in a computer memory device for controlling the processor. A color management resource, as well as color gamut characterizations used to generate the color management resource, can include an array or other data structure on a memory device that replaces runtime computations with a simpler array indexing operation as a color look up table.

FIG. 3 illustrates an example system 300 including a computing device 302 having a processor 304 and memory 306 and program 308 to implement example methods 100, 200. Program 308 can be implemented as a set of processor-executable instructions stored on a non-transitory computer readable medium. Computer readable media, computer storage media, or memory may be implemented to include a volatile computer storage media, nonvolatile computer storage media, or as any suitable method or technology for storage of information such as computer readable instructions, data structures, program modules or other data. A propagating signal by itself does not qualify as storage media or a memory device.

System 300 is configured to receive information regarding the transformation of the source color to the target color for a printing device. System 300 is configured to receive the first luminosity amount 310. Additionally, system 300 is configured to receive a depletion color formulation 312, which can include amounts of process color printing agents or colorants used in generating the target color, and black channel amounts 314 of printing agents or colorants used in generating the target color. System 300 is configured to implement methods 100, 200 and generate a color management resource 316. Amounts 310, 312, 314, and color management resource 316 can be provided as a data structure on a computer readable medium. In one example, the color management resource 316 is included on a memory device that can be operably coupled to the target printing device, such as software or firmware of the target printing device, or as part of a supply component operably coupled to the target printing device such as an ink cartridge or other part for use with the target printing device. In one example, the values of the process color amounts in the depletion formulation 312 and black channel amounts 314 in the target color are associated with amounts, such as volumes, of a print substance used to be applied by the printing device, such as via a print head, to generate the target color corresponding with the source color. For example, the values of the process color amounts in the depletion formulation 312 and black channel amounts 314 in the target color are associated with amounts, such as volumes, of a fluid print substance, such as cyan, magenta, yellow, and black ink, used to be applied by the printing device, such as via a two-dimensional printer, to generate the target color corresponding with the source color.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A non-transitory computer readable medium comprising instructions when executed cause a processor to:
    convert a source color from a first color space to a corresponding greyscale color in a greyscale color space, the corresponding greyscale color having a first luminosity amount, the source color corresponding with a depletion color in a second color space, the depletion color having a second luminosity amount; and
    generate a target color in a color resource via an adjusted black channel amount in the depletion color to match the second luminosity amount with the first luminosity amount.

2. The non-transitory computer readable medium of claim 1 wherein the target color includes the depletion color having a plurality of process color amounts and the adjusted black channel amount corresponding with a formulation of print substances in a printing device.

3. The non-transitory computer readable medium of claim 2 wherein the process color amounts include an amount of print substance for the printing device.

4. The non-transitory computer readable medium of claim 1 wherein the first color space is an additive color space.

5. The non-transitory computer readable medium of claim 1 further comprising mapping the target color to the source color in the color resource.

6. The non-transitory computer readable medium of claim 1 wherein the depletion color includes a selected process-color formulation of the source color.

7. The non-transitory computer readable medium of claim 6 wherein the formulation of the depletion color is made with reference to a hue of the source color and amounts of print substances in components of a full color in the second color space, the full color corresponding with the source color.

8. The non-transitory computer readable medium of claim 1 wherein the source color is converted to the corresponding greyscale color via a transformation.

9. The non-transitory computer readable medium of claim 1 wherein the first luminosity amount is provided via measurement of the greyscale color applied to a substrate.

10. A non-transitory computer readable medium comprising instructions when executed cause a processor to:
    transform a source color from a first color space to a target color in a printing device color space,
    the source color corresponds with a depletion color in the printing device color space and with a greyscale color in a greyscale color space, wherein a black channel amount in the depletion color has been adjusted to form the target color such that a luminosity amount of the target color matches a luminosity amount of the greyscale color.

11. The non-transitory computer readable medium of claim 10 operably coupled to a supply component.

12. The non-transitory computer readable medium of claim 11 wherein the supply component is an ink cartridge.

13. The non-transitory computer readable medium of claim 11 wherein the supply component is operably couplable to a printing device.

14. The non-transitory computer readable medium of claim 10 further comprising providing a plurality of process color amounts and the black channel amount of the target color.

15. The non-transitory computer readable medium of claim 14 wherein the plurality of process colors amounts and the black channel amount are associated with volumes of print substances of the target color for a printing device of the printing device color space.

16. The non-transitory computer readable medium of claim 10 further comprising applying the target color with a printing device.

17. The non-transitory computer readable medium of claim 10 wherein the depletion color corresponds with a full color in the printing device color space in a color resource, the full color associated with the source color.

18. A method of generating a color resource, the method comprising:
    determining a first luminosity amount of a greyscale color in a greyscale color space, the greyscale color corresponding with a transformation of a source color in a first color space converted to the greyscale color, the source color corresponding with a depletion color in a second color space, the depletion color having a second luminosity amount; and
    generating a target color in a color resource via adjusting a black channel amount in the depletion color to match the second luminosity amount with the first luminosity amount, the target color to correspond with the source color in the color resource.

19. The method of claim 18 wherein the determining the first luminosity amount includes determining the luminosity via translation, the first luminosity amount related to luminous intensity of the greyscale color.

20. The method of claim 18 and further comprising applying the color resource to a supply component or a printing device.

* * * * *